United States Patent [19]
Kelley

[11] Patent Number: 4,905,029
[45] Date of Patent: Feb. 27, 1990

[54] AUDIO STILL CAMERA SYSTEM
[76] Inventor: Scott A. Kelley, 1261 Enclave Cir. #2203, Arlington, Tex. 76011
[21] Appl. No.: 250,712
[22] Filed: Sep. 28, 1988
[51] Int. Cl.⁴ ............................................. G03B 29/00
[52] U.S. Cl. ....................................... 354/76; 354/106
[58] Field of Search ............................. 354/76, 75, 106

[56]  References Cited
U.S. PATENT DOCUMENTS

| | | | |
|---|---|---|---|
| 4,128,322 | 12/1978 | Stemme | 354/83 |
| 4,270,853 | 6/1981 | Hatada et al. | 354/86 X |
| 4,270,854 | 6/1981 | Stemme et al. | 354/86 X |
| 4,589,755 | 5/1986 | Maitani | 354/431 |
| 4,752,797 | 6/1988 | Sekine | 354/212 |

*Primary Examiner*—Michael L. Gellner

[57]  ABSTRACT

An Audio Still Camera System for recording a still image and sound, comprising a camera for recording still images onto a photogrpahic recording medium and sound recording means to record sound during the general time period in which the photographic record is made. The system includes a photographic recording medium with an integral suitable storage medium modifiable to record an acoustic signal. The system includes means for sound playback through the camera itself and or sound playback through separate means. The system allows the user to playback sound associated with a photograph after the photograph has been inserted into a photo album or frame. The system may be incorporated into the common cartridge film camera concept or the instant photograph camera concept. The result of the system is to present the user with a still photographic record enhanced by the dimension of sound.

2 Claims, 7 Drawing Sheets

AUDIO STILL CAMERA SYSTEM

BACKGROUND

1. Field of Invention

This invention relates to still cameras, specifically to the invention of an Audio Still Camera System for the purpose of providing a still photographic recording enhanced by the dimension of sound.

2. Description of Prior Art

Cameras have existed for a substantial period of time and many different types are common. Some of the more common cameras are: motion picture cameras, still cameras and instant cameras.

The motion picture camera records visual images continuously or nearly continuously and usually has continuous sound recording capability, this provides the user with a very desirable record of past events. However, the motion picture camera and the necessary equipment to later view the film, presents the user with a relatively heavy, bulky, expensive and mostly inconvenient means for recording past events for most every day purposes.

The still camera projects a visual image onto a stationary photographic recording medium. A still camera usually has the capability of recording several still images before its photographic film must be processed, the user is then provided with a visual record of past events usually consisting of common prints or slides. The still camera is lighter, less bulky, less expensive and more convenient than the motion picture camera, however, the still camera does not provide the user with the dimension of sound.

The instant camera projects a visual image onto a stationary photographic recording medium. Instant camera have a photographic recording medium which develops independently and in a short period of time. Many instant cameras have a mechanical transport system to transport the photograph outside the camera housing once the photograph has been exposed. The instant camera is convenient and provides the user with a finished photograph within a short period of time. The instant camera does not provide the user with the dimension of sound.

OBJECT AND ADVANTAGES

Accordingly, the following objects and advantages are claimed by the invention: an Audio Still Camera System that will provide the user with a still photographic record enhanced by the dimension of sound. The system has advantage over prior art motion picture/sound cameras because the required equipment and complexity of operation for motion picture/sound cameras is often impractical for every day purposes. The system has advantage over prior art still cameras because still cameras do not record sound. The system has advantage over prior art instant still cameras because instant still cameras do not record sound. The Audio Still Camera System provides a means to record sound during the general time period in which the photographic record is made. The system provides means for sound playback through the camera itself and or sound playback through separate means. This allows the user to view a photograph with sound, immediately after the photograph is developed.

The system allows the user to playback sound associated with a given photograph after the photograph has been inserted into a photo album or frame. The system may be incorporated into the common cartridge film camera concept or the instant photograph camera concept.

Further objects and advantages of the invention will be found from a consideration of the following description and the accompanying drawings.

DRAWING FIGURES

DRAWING REFERENCE NUMERALS

Figure 1:
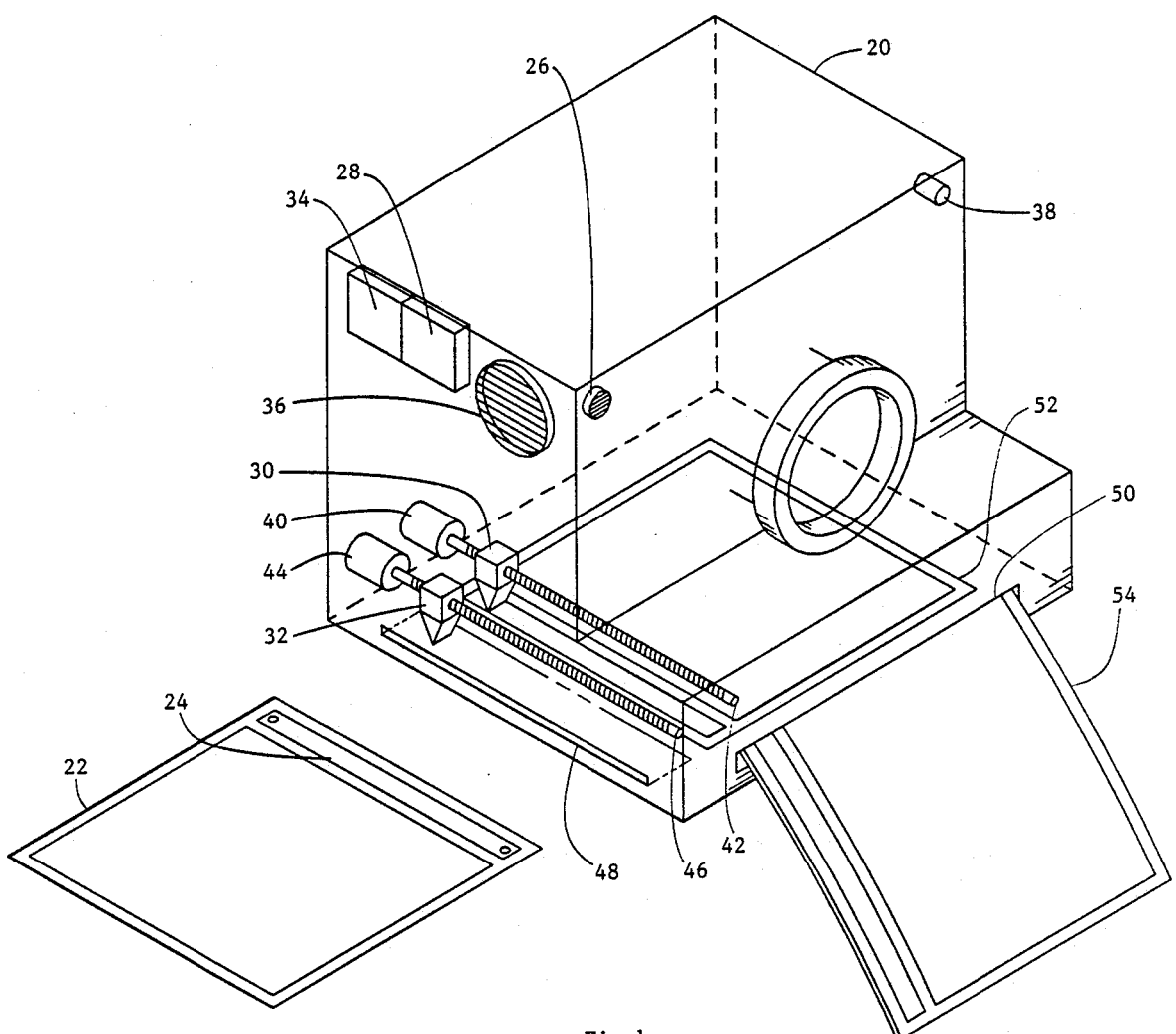
FIG. 1 Shows a perspective front elevational view of a housing for an instant camera and parts relating to such housing according to the invention.

20 Camera housing
22 Photographic recording medium with integral acoustic recording medium
24 Acoustic recording medium integral to 22
26 Microphone
28 Electric signal amplifier
30 Recording transducer
32 Playback transducer
34 Electric signal amplifier
36 Acoustic speaker
38 Signaling means
40 Electric drive motor
42 Transport screw
44 Electric drive motor
46 Transport screw
50 Exit opening for 22
52 22 shown in record position
54 22 shown in exit position
64 Camera housing
66 Acoustic recording medium
68 Microphone
70 Electric signal amplifier
72 Recording transducer
74 Playback transducer
75 Electric signal amplifier
78 Recording transducer
80 Playback transducer
82 Electric signal amplifier
84 Acoustic speaker
86 Signaling means
90 Electric drive motor
91 Reel attached to 90
92 Electric rewind motor
94 Reel attached to 92
96 Electric cord 98 Electric plug
100 Receptacle for 98
102 Acoustic recording medium
104 Receptacle for 102
106 Exit for 102
108 Electric drive motor
110 Upper capstan attached to 108
112 Lower capstan
114 Housing
124 Housing
126 Photographic recording medium
128 Acoustic recording medium integral to 126
130 Playback transducer
132 Electric signal amplifier
134 Acoustic speaker
136 Electric drive motor
138 Transport screw
140 Receptacle for 126
150 Housing
152 Acoustic recording medium
154 Playback transducer
156 Electric signal amplifier
158 Acoustic speaker
160 Electric drive motor
162 Transport screw
164 Locating hole in 152
166 Locating pin for 164
168 Window in 150
178 Acoustic recording medium
180 Backing for 178
182 Locating hole
184 Peel tape
186 Top view of 178
188 Side view of 178
190 Acoustic recording medium
192 Photographic recording medium
194 Locating hole in 190,192
196 Side view of 192
198 Acoustic recording medium
200 Photographic recording medium
202 Side view of 200

OPERATION—AUDIO STILL CAMERA SYSTEM

Figure 9:
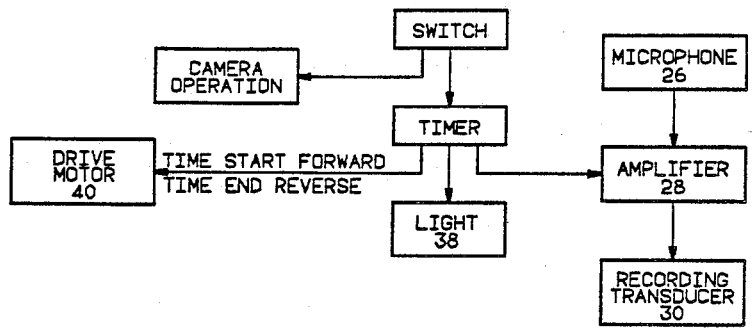
Figure 10:
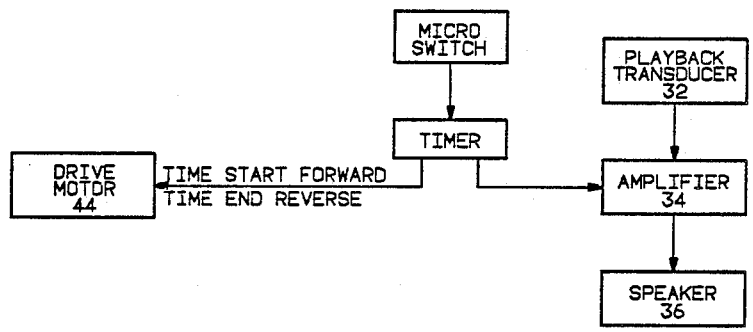

FIG. 1 shows the Audio Still Camera System utilizing the common instant camera concept. Primary components of the system are shown in FIG. 1, and electrical sequence flowcharts are shown in FIGS. 9 and 10. Referring to FIG. 1, photographic recording medium 22 and acoustic recording medium 24 are integral to each other, the acoustic recording medium 24 may be any magnetizable material, such as plastic tape coated with iron oxide. Initially, photographic recording medium 52 is positioned inside camera housing so that integral acoustic recording medium rests very close to, or in contact with recording transducer 30. The switch in FIG. 9 is a multifunction button type switch so that preferably but not essentially, the acoustic recording may be conveniently initiated and completed just before the photographic recording is made. When acoustic recording is initiated by switch FIG. 9, sound received by microphone 26 is converted into an electrical signal and amplified 28. The amplified signal is received by recording transducer 30 and converted into a corresponding magnetic field. Simultaneously, power is supplied to electric drive motor 40. Drive motor 40, FIG. 1, is attached to transport screw 42 which engages recording transducer 30. Electric drive motor 40 rotates transport screw 42 which translates recording transducer 30, providing the necessary relative motion between recording transducer 30 and acoustic recording medium integral to photographic recording medium 52 for the recording of sound. Simultaneously, a light 38 is illuminated to signal to persons being photographed that sound is also being recorded. The light 38 is any electric light sufficiently bright to be seen at a distance of up to 20 feet, and may be colored, preferably red. After five seconds, timer FIG. 9, will disconnect power supplied to amplifier 28 and light 38 and reverse power supplied to drive motor 40 to stop audio recording and bring recording transducer 30 back to original position FIG. 1. The switch FIG. 9 is a multifunction button type switch and can be further depressed at any time to initiate camera operations.

After acoustic recording and photographic recording is made, photographic recording medium 54, FIG. 1 is ejected from camera housing by a transport mechanism common to instant cameras. The photographic recording medium 22 is inserted into receptacle 48 as shown in FIG. 1. Receptacle 48 shall be designed to position acoustic recording medium portion 24 of photographic recording medium 22 so that acoustic recording medium 24 rests very close to, or in contact with playback transducer 32. Inside receptacle 48, a microswtich FIG. 10 will detect the presence of acoustic recording medium 24, FIG. 1, and initiate acoustic playback. Magnetic field sensed by playback transducer 32 is converted into an electrical signal and amplified 34, FIG. 10. The amplified signal is received by speaker 36 and converted into audible sound pressure waves reproducing sound originally received by microphone 26, FIG. 1. Simultaneously, power is supplied to electric drive motor 44. Drive motor 44 is attached to transport screw 46 which engages playback transducer 32. Drive motor 44 rotates transport screw 46 which translates playback transducer 32, providing the necessary relative motion between playback transducer 32 and acoustic recording medium 24 for the playback of sound. After five seconds, timer FIG. 10, will disconnect power supplied to amplifier 34 and drive motor 40. Microswitch FIG. 10 is a multifunction switch and shall reinitiate timer to supply reversed power to drive motor 44 upon removal of acoustic recording medium 24 from receptacle 48, returning playback transducer 32 to original position FIG. 1.

Figure 4:
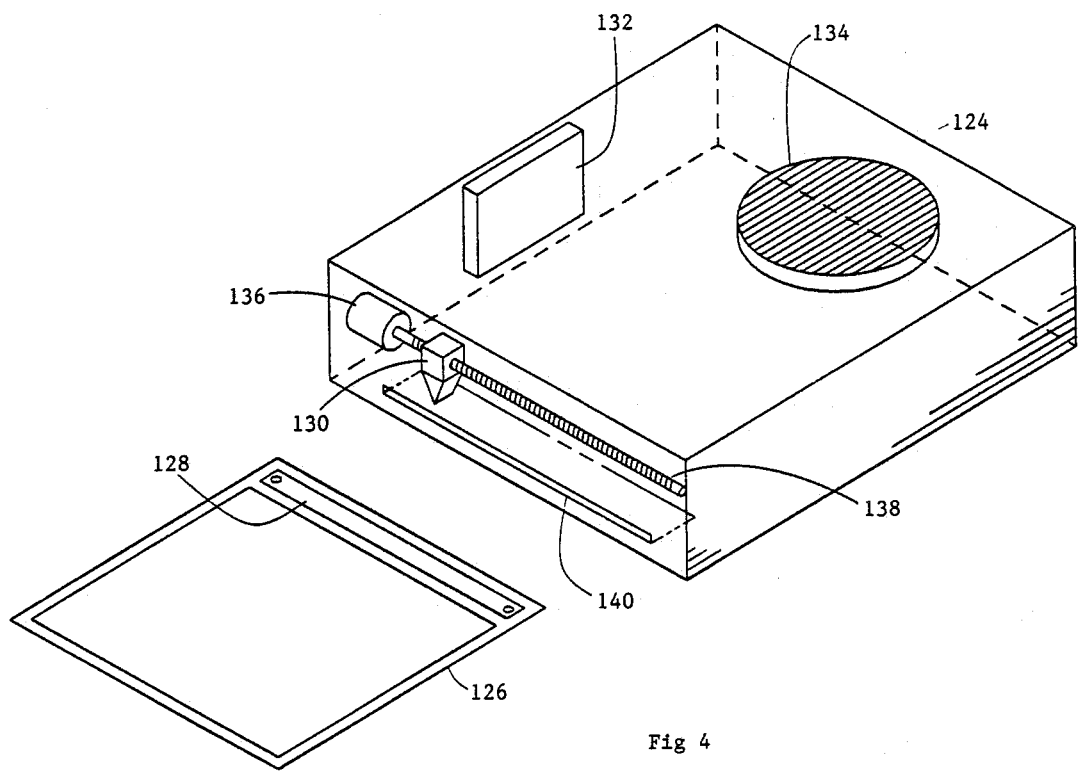
FIG. 4 Shows a perspective elevational view of a housing and parts relating to such housing according to the embodiment of the invention shown in FIG. 1.

FIG. 4 is another embodiment of the elements required for playback of the acoustic recording medium 24, FIG. 1. Elements FIG. 4 are identical to corresponding elements described by FIGS. 1 and 10 except elements FIG. 4 are housed separately. This embodiment may be used instead of, or in conjunction with corresponding elements described by FIG. 1. The embodiment FIG. 4, provides the user with a more lightweight, convenient means for sound playback while simultaneously veiwing a photograph.

Figure 2:
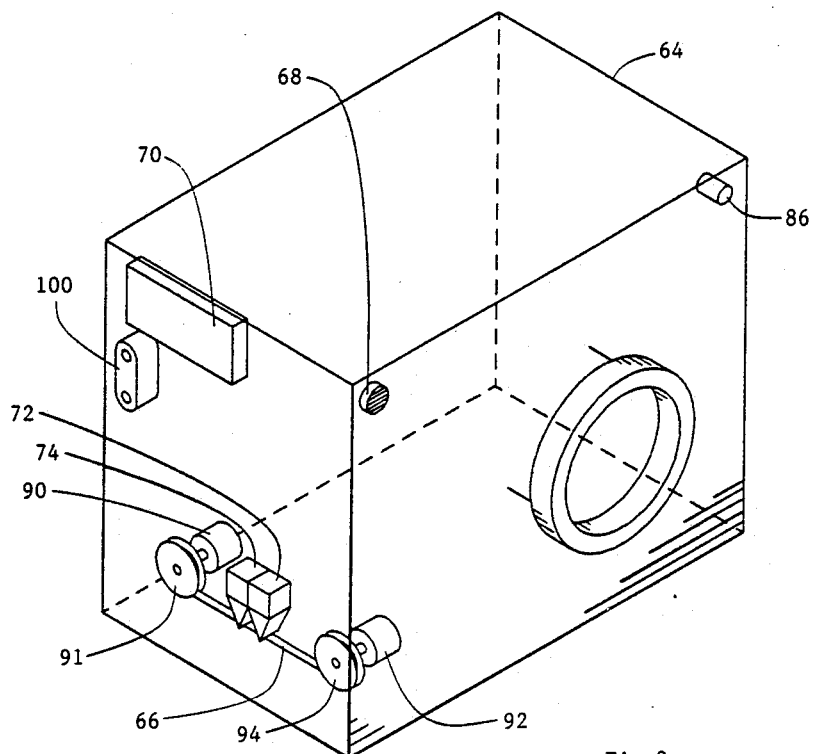
FIG. 2 Shows a perspective front elevational view of a housing for a cartridge film camera and parts relating to such housing according to the invention.
Figure 3:
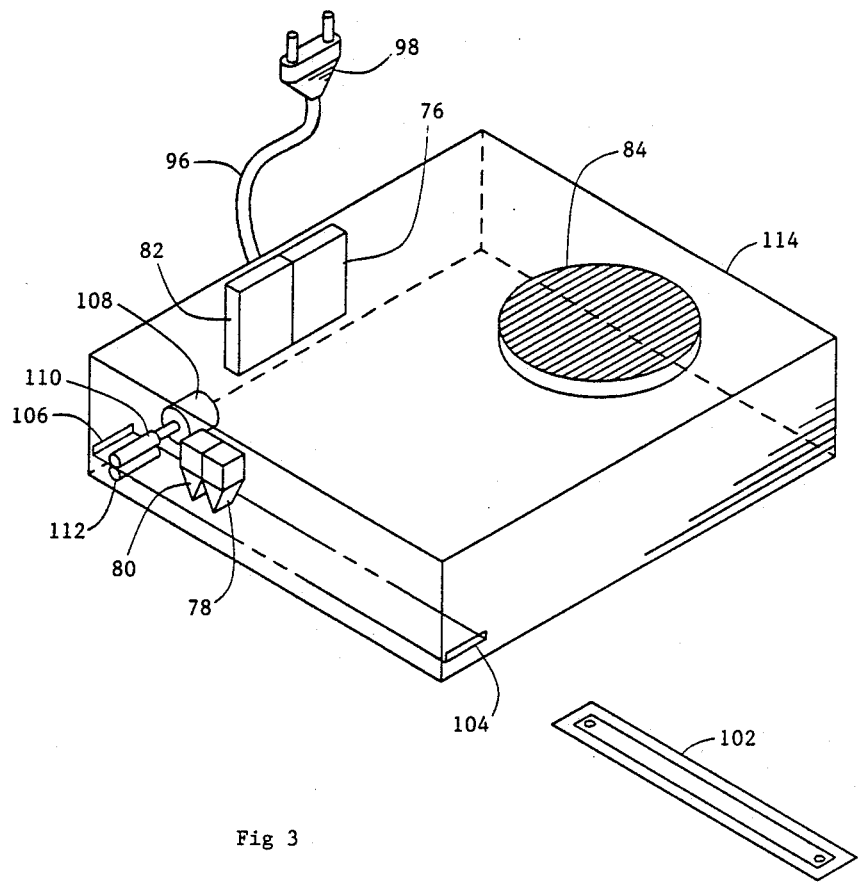
FIG. 3 Shows a perspective elevational view of a housing and parts relating to such housing according to the embodiment of the invention shown in FIG. 2.
Figure 11:
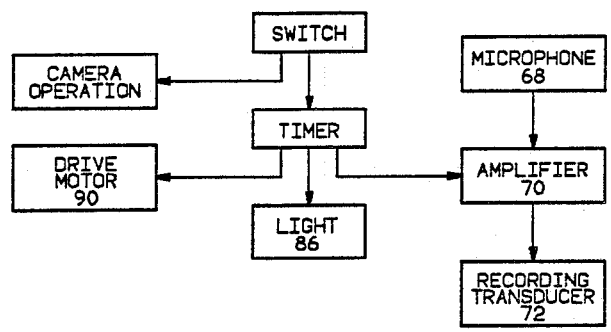
Figure 12:
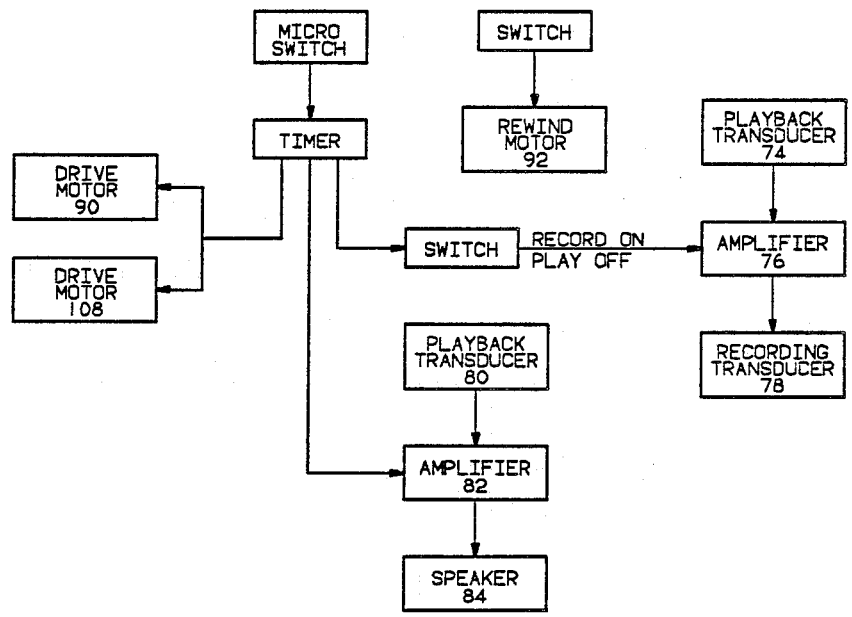

FIG. 2 shows an embodiment of the Audio Still Camera System utilizing the common still camera concept. Primary components of the system are shown in FIGS. 2 and 3, electrical sequence flowcharts are shown in FIGS. 11 and 12. Referring to FIG. 2, the acoustic recording medium 66 may be any magnetizable material such as metallic tape or plastic tape coated with iron oxide, preferably of high quality to withstand repeated use. Provisions may be incorporated to allow replacement of acoustic rcording medium 66 in the event that it becomes defective or worn, but otherwise it is considered to be a permanent component inside the camera housing. The acoustic recording medium 66 is positioned so that it is very close to, or in contact with recording transducer 72 and playback transducer 74. The switch FIG. 11 is a multifunction button type switch so that preferably but not essentially, the acoustic recording may be conveniently initiated and completed just before the photographic recording is made. When acoustic recording is initiated by switch FIG. 11, sound received by microphone 68 is converted into an electrical signal and amplified 70. The amplified signal is received by recording transducer 72 and converted into a corresponding magnetic field. Simultaneously, power is supplied to electric drive motor 90. Drive motor 90, FIG. 2 is attached to reel 91 which is attached to acoustic recording medium 66. Drive motor 90 rotates reel 91 causing acoustic recording medium 66 to translate relative to recording transducer 72, providing the necessary relative motion for the recording of sound. Simultaneously, a light 86 is illuminated to signal to persons being photographed that sound is also being recorded. The light 86 is any electric light sufficiently bright to be seen at a distance of up to twenty feet, and may be colored, preferably red. After five seconds, timer FIG. 11, will disconnect power supplied to amplifier 70, light 86 and drive motor 90. The switch FIG. 11 is a multifunction button type switch an can be further depressed at any time to initiate camera operations. Acoustic recording medium 66 shall translate in increments as described for five second intervals, each corresponding to a given frame on photographic film inside camera.

In reference to FIG. 3, acoustic recording medium 102 is any magnetizable material sufficiently rigid to be inserted into receptacle 104, such as rigid plastic tape coated with iron oxide.

A switch FIG. 12 is operated by the user or by a logic circuit completed by insertion of plug 98 into receptacle 100, FIGS. 2 and 3, to supply power to rewind motor 92, returning acoustic recording medium 66, FIG. 2, to original position. Switch FIG. 12 may include a spring back feature to disconnect power supplied to rewind motor 92 if user operated, or a resistance sensitive circuit may be employed to detect rewind motor 92 overload and disconnect power, or a tape position sensor may be incorporated to disconnect power.

Plug 98, FIG. 3 is inserted into receptacle 100, FIG. 2. Acoustic recording medium 102 is inserted into receptacle 104 as shown in FIG. 3. Receptacle 104 shall be designed to position acoustic recording medium 102 so that acoustic recording medium 102 rests very close to, or in contact with playback transducer 80 and recording transducer 78. Acoustic recording medium 102 becomes engaged between lower capstan 112 and upper capstan 110 which is attached to drive motor 108. Inside receptacle 104, a microswitch FIG. 12 detects full insertion of acoustic recording medium 102, FIG. 3 and initiates acoustic recording and acoustic playback simultaneously. Power is supplied to drive motor 108 and to drive motor 90. Power from batteries or transformer within housing 114, FIG. 3 may be supplied to drive motor 90, FIG. 2 by electric cord 96, FIG. 3. Drive motor 108 rotates capstan 110 which engages acoustic recording medium 102 causing acoustic recording medium 102 to translate relative to recording transducer 78 and playback transducer 80, providing the necessary relative motion for the recording and playback of sound. Drive motor 90 shall rotate so that linear velocities of acoustic recording medium 66, FIG. 2 and acoustic recording medium 102, FIG. 3 are, for practical purposes, synchronized. This may be possible without the use of a capstan drive system to transport acoustic recording medium 66, FIG. 2 because the small amount of magnetic tape on reel 91 presents a relatively constant tape diameter.

Magnetic field sensed by playback transducer 74, FIG. 12 is converted into an electrical signal and received by amplifier 76 by electric cord 96, FIG. 3. Electric signal is amplified 76, FIG. 12 and received by recording transducer 78 which records such signal onto acoustic recording medium 102, FIG. 3, effectively copying signal recorded on acoustic recording medium 66, FIG. 2. Simultaneously, magnetic field sensed by playback transducer 80, FIG. 3 is converted into an electric signal and amplified 82, FIG. 12. The amplified signal is received by speaker 84 and converted into audible sound pressure waves reproducing sound originally received by microphone 68, FIG. 2, enabling th user to hear recordings as they are being copied onto acoustic recording medium 102, FIG. 3. After five seconds, timer FIG. 12, will disconnect power supplied to amplifiers 76 and 82 and drive motors 90 and 108. Power may also be interrupted by incorporation of a second microswitch or use of a multifunction microswitch to detect complete exit of acoustic recording medium 102, FIG. 3 through exit 106. FIG. 3 may serve as a player only, if a switch FIG. 12 is incorporated to interrupt power supplied to amplifier 76 so that recording will not be erased, and plug 98, FIG. 3 is unplugged from receptacle 100, FIG. 2 to interrupt power supplied to drive motor 90.

Several acoustic recording mediums 102, FIG. 3 may be recorded and played as described, each corresponding to a photograph taken by camera FIG. 2.

Figure 5:
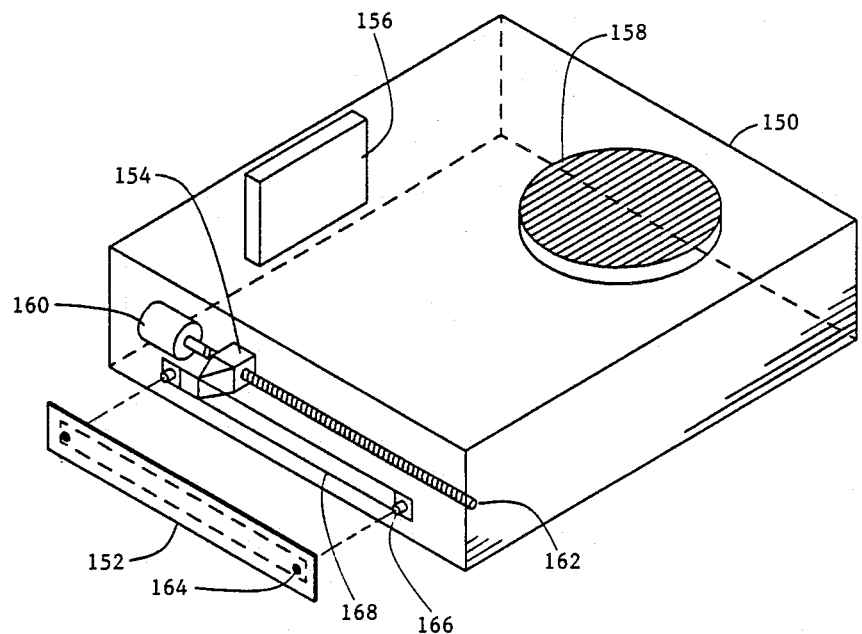
FIG. 5 Shows a perspective elevational view of a housing and parts relating to such housing according to the embodiment of the invention shown in FIG. 1 or FIGS. 2 and 3.

FIG. 5 is another embodiment of the elements required for playback of the acoustic recording medium 102. FIG. 3, and or acoustic recording medium 24, FIG. 1. This embodiment allows the user to playback sound associated with a photograph, after the photograph has been inserted into a photo album Elements FIG. 5 are identical to corresponding elements described by FIGS. 1 and 10 with the exception of window 168, FIG. 5 and locating pins 166. Locating pins 166 engage into locating holes 164 providing proper locating and alignment of acoustic recording medium 152 relative to playback transducer 154. Window 168 allows playback transducer 154 to come very close to, or in contact with acoustic recording medium 152. Locating pin 166 configuration shown is not essential, any locating features which would provide the same function may be employed, for example, a recess in housing 150 of the same shape and depth as recording medium 152 would serve the positioning function by holding recording medium 152 about its perimeter.

Figure 6:
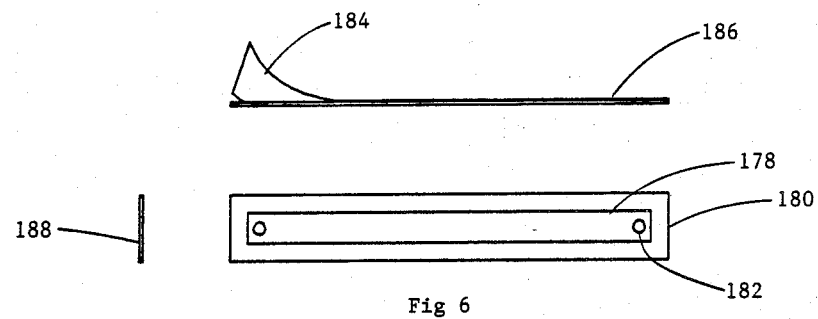
FIG. 6 Shows an embodiment of acoustic recording medium.

FIG. 6 is a detailed embodiment of acoustic recording medium 102, FIG. 3. Backing 180, FIG. 6 provides necessary rigidity for insertion into receptacle 104, FIG. 3 if a flexible magnetizable material is employed. Backing 180, FIG. 6 may be any stiff material that will permit magnetization of acoustic recording medium 178, such as plastic or cardboard. Backing 180 may be affixed to acoustic recording medium 178 by a thin film of adhesive agreeable to both materials. If an acoustic recording medium of sufficient rigidity is chosen, backing 180 may not be required. Acoustic recording medium FIG. 6 may be affixed directly onto a photograph or directly onto a page in a photo album by adhesive on the back side of backing 180, adhesive is preserved until ready for use by peel tape 184. Locating holes 182 provide proper locating and positioning of acoustic recording medium 178 as requird by locating pins 166, FIG. 5, although any locating features may be employed consistent with those employed by FIG. 5.

Figure 7:
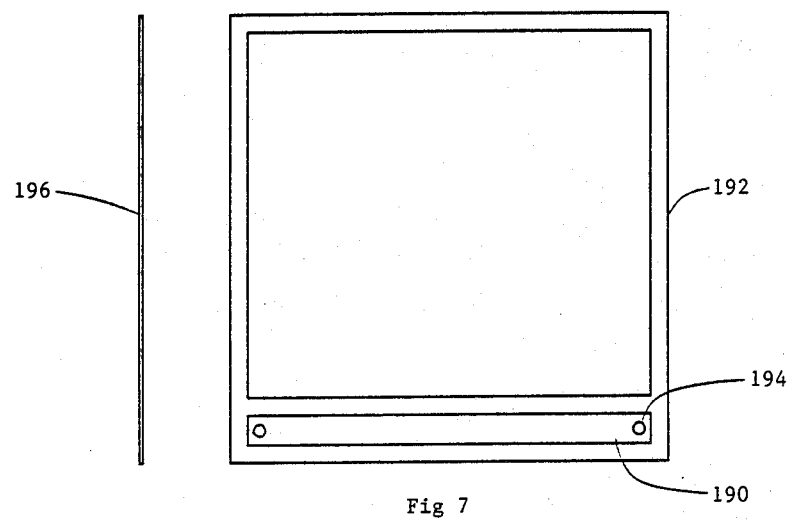
FIG. 7 Shows an embodiment of acoustic recording medium integral to photographic recording medium.
Figure 8:
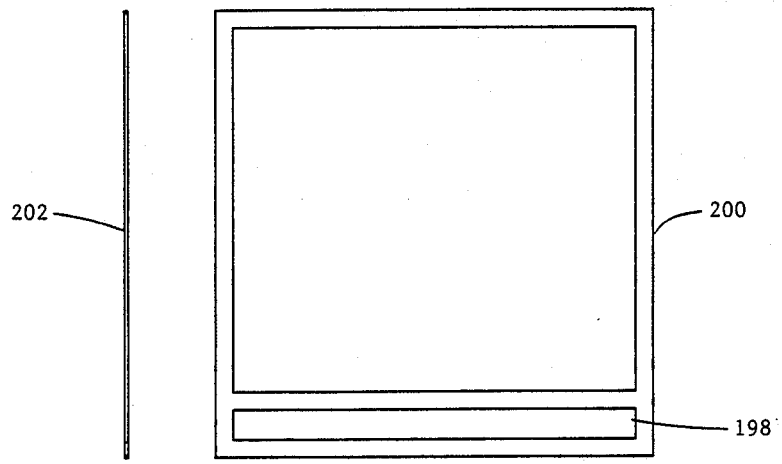
FIG. 8 Shows an embodiment of acoustic recording medium integral to photographic recording medium.

FIG. 7 is an embodiment of acoustic recording medium 24, FIG. 1 integral to photographic recording medium 22. Acoustic recording medium 190, FIG. 7 is any magnetizable material and may be affixed to photographic recording medium with a thin film of adhesive suitable to both materials. Acoustic recording medium 190 may be made integral to photographic recording medium 192 by insertion of acoustic recording medium 190 between paper laminates of photographic recording medium 192 at time of manufacture. Embodiment FIG. 7 may be used with embodiments shown by FIGS. 1, 4 and 5. FIG. 8 is another embodiment of th embodiment described by FIG. 7, except without locating holes. Embodiment FIG. 8 may be used with embodiments described by FIGS. 1 and 4.

In the foregoing disclosure of the invention, many elements and methods are described without discussion of possible variation for the purpose of example and clarity.

Although not currently practical, the acoustic recording mediums in FIGS. 6, 7 and 8 may be replaced with an electronic chip, attached to or embedded in the paper laminates of a photograph. Such an electronic chip would have one or more miniature wire coils extending from it. Such coil or coils would communicate power, input of digitized acoustic signal and output of digitized acoustic signal by magnetic induction. Acoustic signal would be stored in the electronic chip in digitized form. Such an embodiment will be possible because of the relatively short duration of acoustic recording required. Embodiments of the invention FIGS. 1, 2 and 3 would employ analog - digital, and digital - analog circuitry for processing such an electronic chip. Embodiments of the invention FIGS. 4 and 5 would employ digital - analog circuitry for playback of such an electronic chip. The transport mechanisms FIGS. 1-5 which provide relative motion between transducers and acoustic recording mediums would not be required for such an embodiment, thus creating a mechanically simpler system.

Many variations from the foregoing disclosure of the invention are possible, such as arrangement, construction or enhancement of electrical or mechanical components or functions without departing fromthe concept or scope of the appended claims.

I claim:

1. An audio still camera apparatus for producing a still photograph with an associated reproducible acoustic message comprising:

a camera means for capturing a photographic image on a photographic rcording medium;

the camera means incorporating means for sensing an acoustic message associated with the photographic image and means for transferring the sensed acoustic message to acoustic recording medium and signaling means to visually or audibly indicate the beginning and termination of transferring sensed acoustic message to acoustic recording medium; and means for sensing and converting the message from the acoustic recording medium to an electrical signal suitable for playback of the recorded message.

2. An audio still camera system comprising a non instant camera for recording still images onto a photographic recording medium, and:

a first means for receiving an acoustic signal and converting said acoustic signal into an electrical signal;

a second means for receiving and amplifying electrical signal from said first means;

a third means for receiving electrical signal from said second means and for modifying a suitable storage medium so that said suitable storage medium records electrical signal from said second means corresponding with a given still image recorded by said camera, so that such recordings from said second means shall for a given still image recording, begin at a time after the previous still image recording and terminate at a time before the following still image recording;

a suitable storage medium permanently or semi permanently housed inside said camera to accept modification from said third means;

a fourth means for sensing modified said suitable storage medium and for converting such sensation into an electrical signal;

a fith means for receiving and amplifying electrical signal from said fourth means;

a sixth means for receiving electrical signal from said fith means and for modifying a second suitable storage medium so that said second suitable storage medium records electrical signal from said fith means;

a second suitable storage medium to accept modification from said sixth means;

a seventh means for sensing modified said second suitable storage medium and for converting such sensation into an electrical signal;

an eighth means for receiving and amplifying electrical signal from said seventh means;

a ninth means for receiving electrical signal from said eighth means and for converting such signal into an audible acoustic signal;

a tenth signaling means to visually or audibly indicate the beginning and termination of recordings made by said third means.

* * * * *